(12) United States Patent
Sudbeck

(10) Patent No.: US 11,214,448 B1
(45) Date of Patent: Jan. 4, 2022

(54) AXLE-INTEGRATED MOVEMENT SENSING APPARATUS FOR CONVEYORS

(71) Applicant: Aaron Sudbeck, Hartington, NE (US)

(72) Inventor: Aaron Sudbeck, Hartington, NE (US)

(73) Assignee: Masaba, Inc., Vermillion, SD (US)

( * ) Notice: Subject to any disclaimer, the term of this patent is extended or adjusted under 35 U.S.C. 154(b) by 0 days.

(21) Appl. No.: 17/022,232

(22) Filed: Sep. 16, 2020

Related U.S. Application Data

(60) Provisional application No. 62/902,578, filed on Sep. 19, 2019.

(51) Int. Cl.
*B65G 43/00* (2006.01)
*B65G 15/30* (2006.01)

(52) U.S. Cl.
CPC ............ *B65G 43/00* (2013.01); *B65G 15/30* (2013.01); *B65G 2811/0673* (2013.01)

(58) Field of Classification Search
CPC ........ B65G 43/00; B65G 21/16; B65G 15/30; B65G 2811/0673; B65G 2811/0678; B65G 41/00–04; B65G 41/0005
See application file for complete search history.

(56) References Cited

U.S. PATENT DOCUMENTS

| | | | | |
|---|---|---|---|---|
| RE22,026 E | * | 2/1942 | Wilson | B60L 3/10 361/242 |
| 5,090,551 A | * | 2/1992 | Yasuhara | B66B 23/04 198/323 |
| 5,624,525 A | * | 4/1997 | Ehara | B08B 17/04 156/360 |
| 6,378,694 B1 | * | 4/2002 | Onoyama | B65G 39/02 198/781.06 |
| 6,459,224 B2 | * | 10/2002 | Itoh | B65G 13/075 198/571 |
| 6,931,227 B2 | * | 8/2005 | Koide | G03G 15/0131 399/165 |
| 6,997,302 B2 | * | 2/2006 | Fargo | B66B 23/02 198/323 |
| 8,086,156 B2 | * | 12/2011 | Tao | G03G 15/0131 399/302 |
| 9,533,831 B2 | * | 1/2017 | Nelson | B65G 43/02 |
| 2017/0166433 A1 | * | 6/2017 | Cross | B68B 1/06 |

* cited by examiner

*Primary Examiner* — Gene O Crawford
*Assistant Examiner* — Lester Rushin, III
(74) *Attorney, Agent, or Firm* — Jeffrey A. Proehl; Woods Fuller Shultz & Smith PC

(57) ABSTRACT

A conveyor system may include a conveyor belt and a conveyor support structure supporting the belt which includes a support truss structure extending between ends of the conveyor support structure. The system may also include a pair of wheels and an axle assembly configured to rotatably support the wheels on the support truss structure. The axle assembly may include an elongated axle housing with opposite ends each having a said wheel of the pair of wheels rotatably mounted thereon, the axle housing having an interior, and a hub rotatably mounted on each of the ends of the axle housing with each hub having one of the wheels mounted thereon. The system may include a rotation detection assembly for detecting rotation of at least one wheel and being integrated with the axle assembly and at least partially positioned within the interior of the axle housing.

18 Claims, 8 Drawing Sheets

AXLE-INTEGRATED MOVEMENT SENSING APPARATUS FOR CONVEYORS

REFERENCE TO RELATED APPLICATIONS

This application claims the benefit of the priority of U.S. Provisional Application No. 62/902,578, filed Sep. 19, 2019, which is hereby incorporated by reference in its entirety,

BACKGROUND

Field

The present disclosure relates to a conveyor control systems and more particularly pertains to a new axle-integrated movement sensing apparatus for sensing wheel rotation on conveyors to determine conveyor movement.

SUMMARY

In one aspect, the present disclosure relates to a conveyor system which may include a conveyor belt and a conveyor support structure configured to support the conveyor belt. The conveyor support structure may include a support truss structure extending between ends of the conveyor support structure, a pair of wheels rotatable about a common rotation axis, and an axle assembly configured to rotatably support the wheels on the support truss structure. The axle assembly may include an elongated axle housing with opposite ends each having a said wheel of the pair of wheels rotatably mounted thereon, the axle housing having an interior, a hub rotatably mounted on each of the ends of the axle housing with each hub having one of the wheels mounted thereon, and a rotation detection assembly for detecting rotation of at least one of the wheels of the pair of wheels. The rotation detection assembly may be integrated with the axle assembly and at least partially positioned within the interior of the axle housing.

In another aspect, the disclosure relates to a rotation detection assembly for detecting rotation of at least one wheel mounted on an axle assembly supporting a conveyor with a conveyor belt, with the axle assembly having an axle housing defining an interior and a rotatable hub on which the at least one wheel is mounted. The assembly may comprise a rotation member at least partially positioned in the interior of the axle housing and being connectable to the hub to rotate with the hub and the at least one wheel mounted on the hub, and a rotation sensor configured to sense rotation of the rotation member, the rotation sensor being positionable in the interior of the axle housing.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
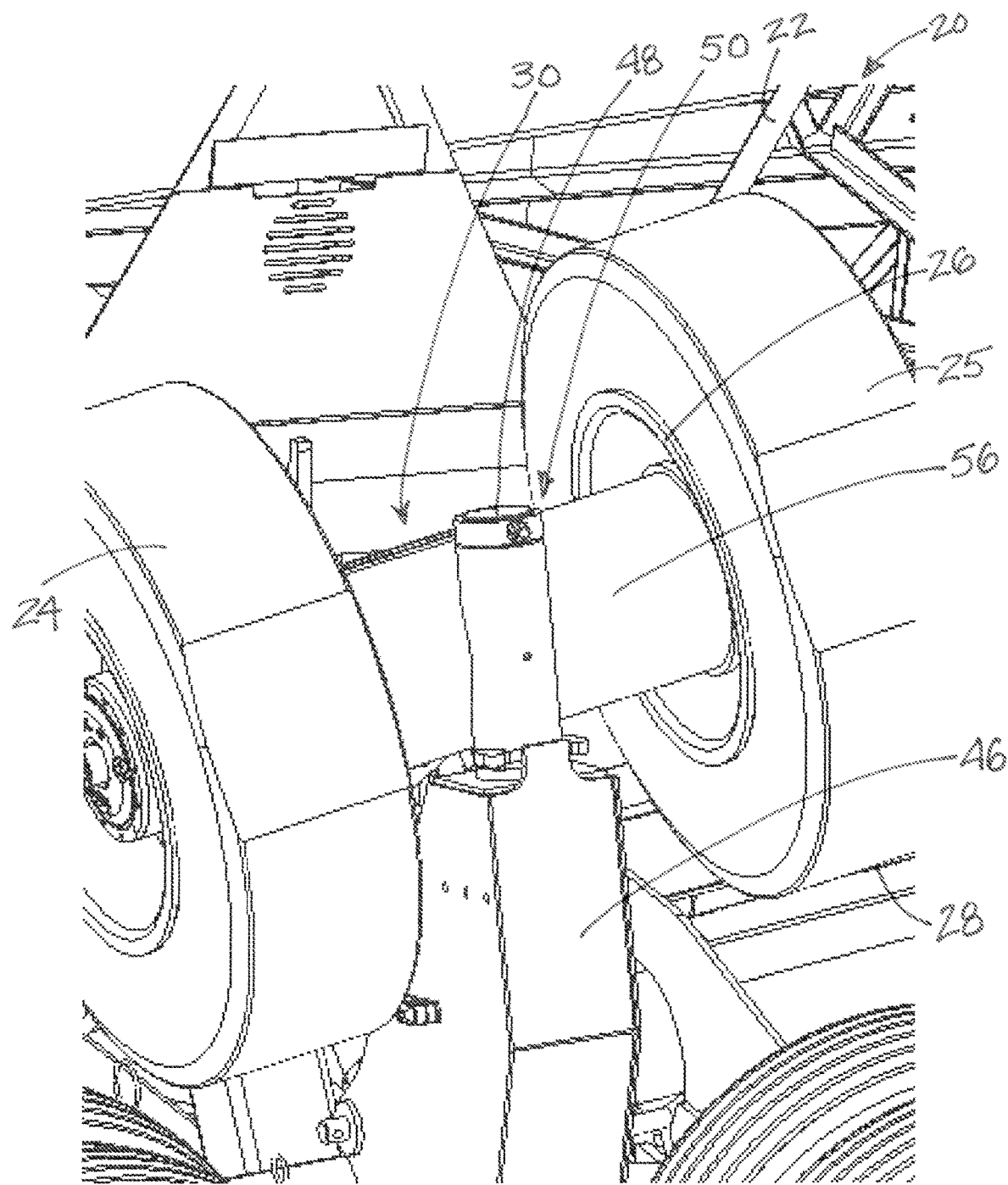
FIG. 1 is a schematic side view of a portion of a conveyor with elements of an axle-integrated movement sensing apparatus according to the present disclosure.
Figure 2:
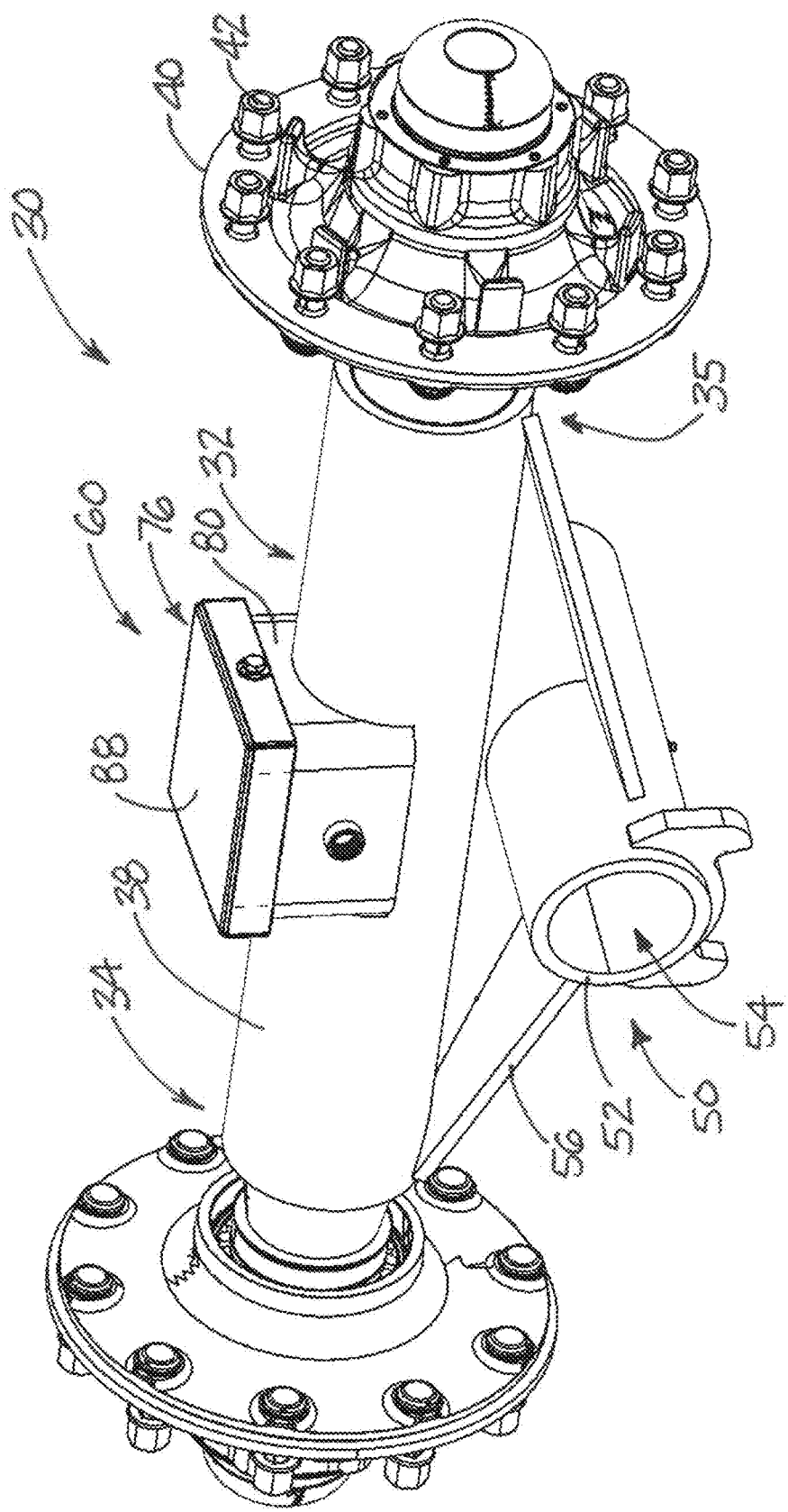
FIG. 2 is a schematic perspective view of elements of the conveyor support structure and rotation detection assembly, according to an illustrative embodiment.
Figure 3:
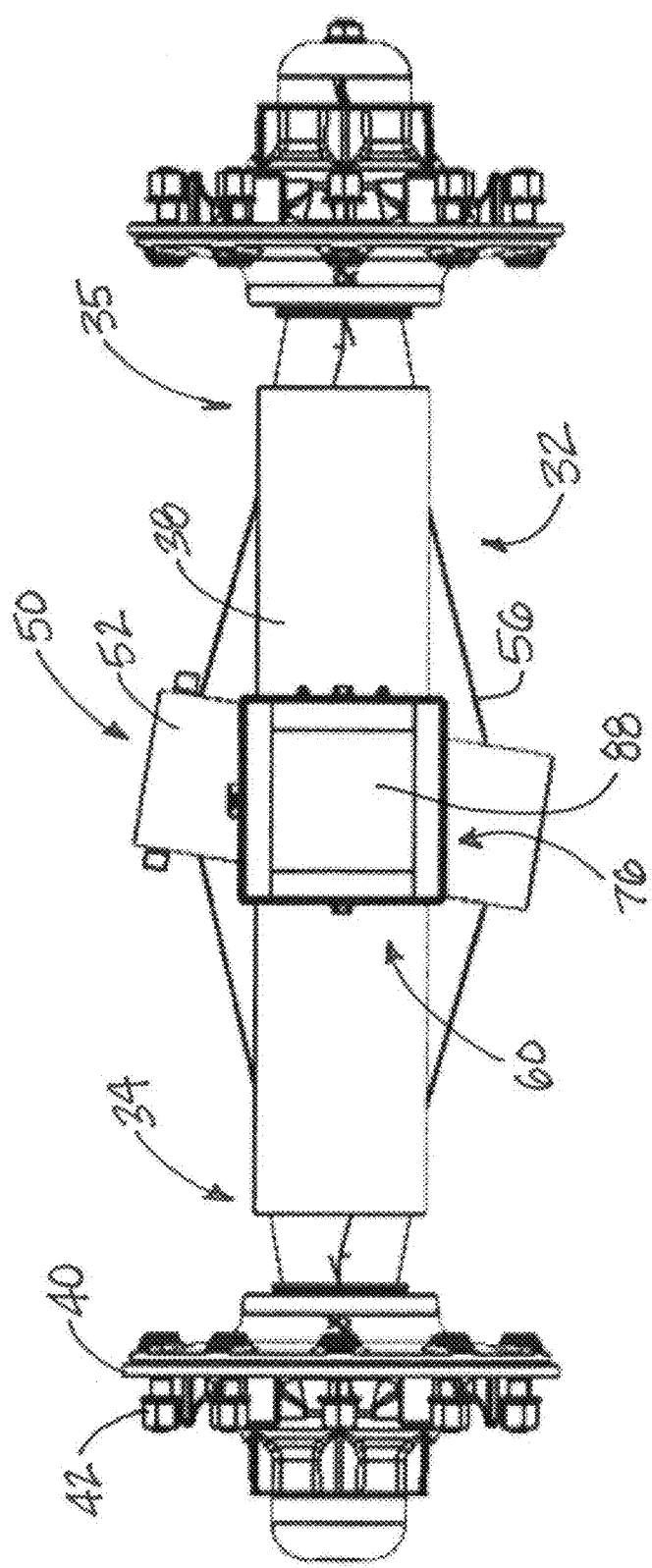
FIG. 3 is a schematic top view of the elements shown in FIG. 2, according to an illustrative embodiment.
Figure 4:
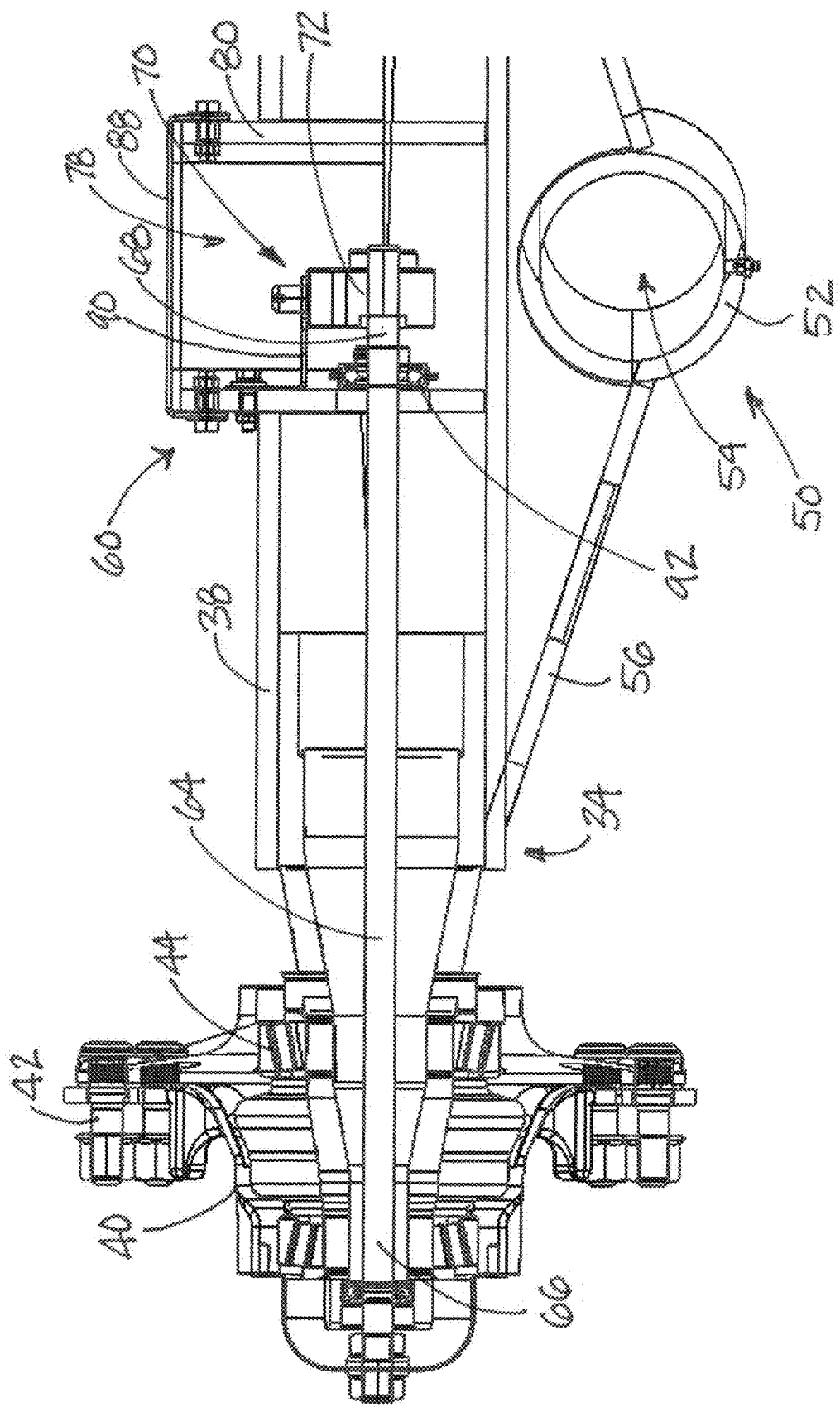
FIG. 4 is a schematic sectional view of a portion of an assembly of elements of the conveyor support structure and rotation detection assembly, according to an illustrative embodiment.
Figure 5:
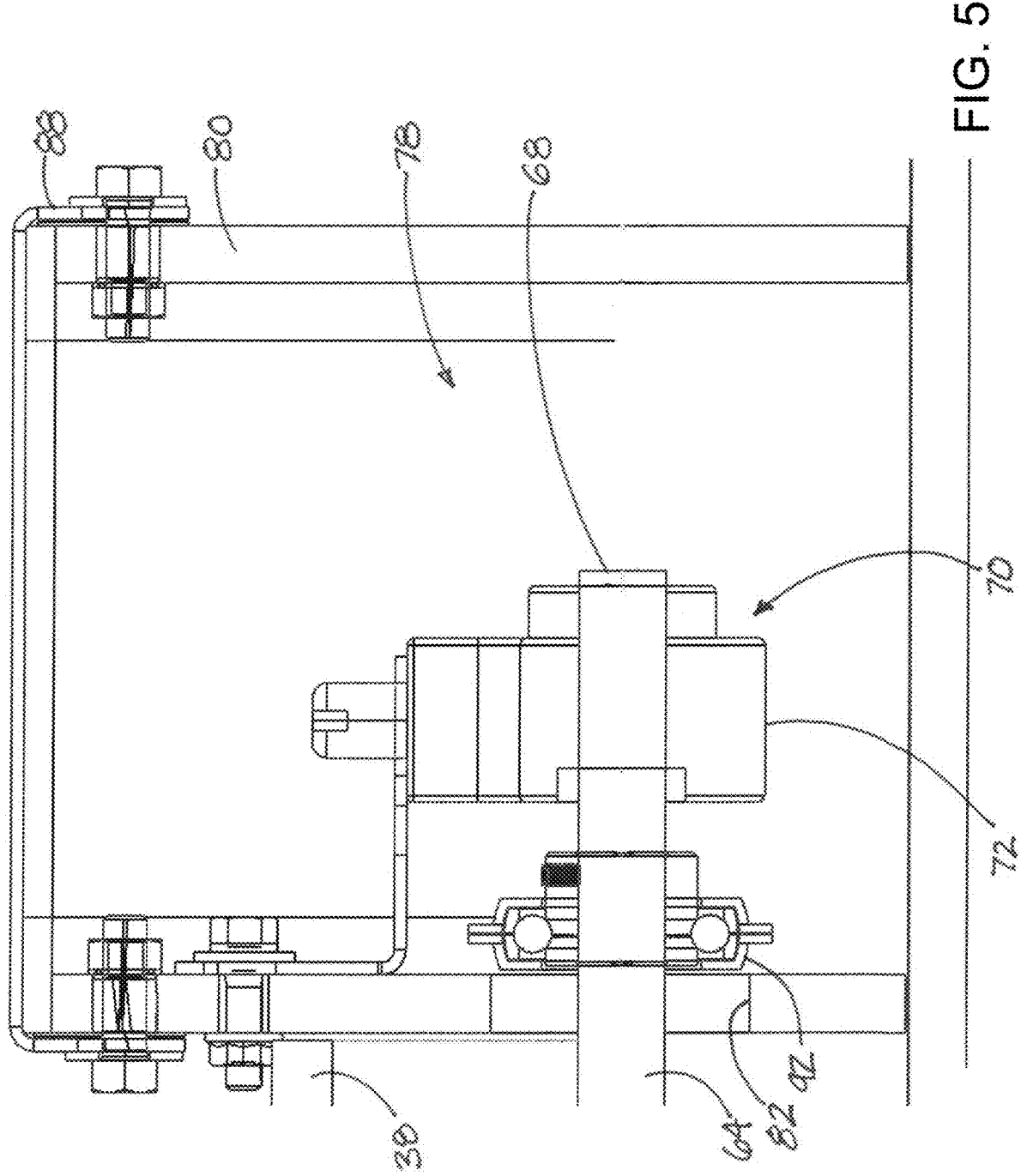
FIG. 5 is a schematic sectional view of elements of the rotation detection assembly, according to an illustrative embodiment.
Figure 6:
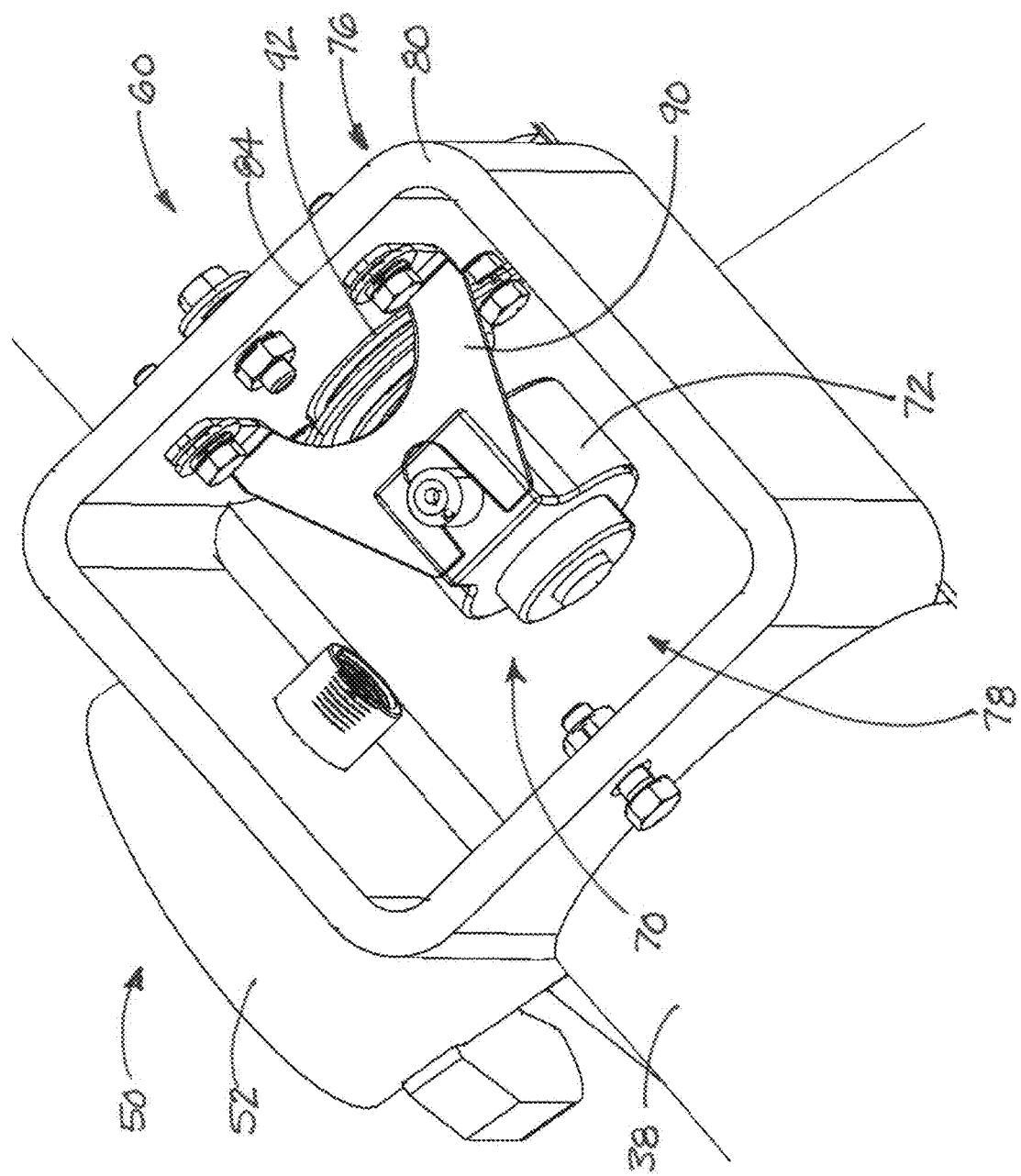
FIG. 6 is a schematic perspective view of elements of the rotation detection assembly, according to an illustrative embodiment.

With reference now to the drawings, and in particular to FIGS. 1 through 8 thereof, a new axle-integrated movement sensing apparatus for conveyors embodying the principles and concepts of the disclosed subject matter will be described.

Movable conveyors, and in particular conveyors designed to facilitate radial stacking of conveyed materials, are desired to move along predefined paths. For example, radial stacking conveyors may move both longitudinally and laterally (about a pivot to form a fan-shaped path) while dispensing the conveyed material to stack the material in a generally uniform piles. To control the movement of the conveyors, especially in an automated manner, and provide the greatest uniformity of piles, monitoring of the movement of the conveyors, especially with respect to the lateral movement, is particularly important to conveyor operation. However, because movement (and particularly lateral movement) is caused by hydraulic motors operating sets of wheels, monitoring and controlling movement through the motors alone is not sufficient to achieve the uniformity of movement that is desired. As a result, sensors are utilized to monitor the degree of actual movement of the conveyors and provide movement information to a controller which in turn controls the operation of the (hydraulic) motors.

The applicants have recognized that the environment in which conveyors operate can be hazardous to sensors utilized to monitor the movement of the conveyors. In particular, the environment is typically dusty and often the path of movement is littered with obstacles such as rocks as well as portions of the conveyed material falling from the conveyor belt. Even when the conveyor is not being operated in the field, transport and storage of the conveyor can also expose movement sensors to rough handling and damage.

To address these problems, the applicants have developed a system to enhance the protection of the movement sensor or sensors utilized on the conveyor to monitor movement, such as lateral movement, of the conveyor.

In one aspect, the disclosure relates to a conveyor 10 which has an inboard end and an outboard end and carries a conveyor belt 12 between the ends. In some applications, the conveyor is configured to rotate about a pivot point located toward the inboard end in a lateral direction to create radial movement and thereby deposit material conveyed by the conveyor in an arcuate pile on the ground surface.

In greater detail, the conveyor 10 may include a conveyor support structure 20 which is configured to support the conveyor belt on the support truss structure. The conveyor support structure 20 may include a support truss structure 22 which generally extends for the length of the conveyor between the inboard and outboard ends, and the truss structure may have a telescopic configuration. The conveyor support structure 20 may also include a pair of wheels 24, 25 which are rotatable about a common rotation axis and may be of any suitable configuration, such as a rim 26 with a tire 28 mounted on the rim. The wheels 24, 25 contact the ground surface beneath the conveyor 10 to facilitate lateral movement of the conveyor and the path of the wheels may be generally along an arc.

The conveyor support structure may further include an axle assembly 30 which is configured to rotatably support the wheels 24, 25 and generally extends along the rotation axis of the wheels and connects the wheels together. The axle assembly 30 may include an axle housing 32 on which the wheels are rotatably mounted and which may be elongated along the rotation axis with opposite ends 34, 35 at which the respective wheels 24, 25 are mounted. The axle housing 32 may have an interior 36 which may be substantially hollow and may be defined and generally surrounded by a perimeter wall 38 which extends between the ends 34, 35. The interior 36 may also be substantially completely enclosed by the perimeter wall 38 as well as other elements to limit or substantially prevent material from the environment of the axle assembly 30 entering the interior 36. Even if not entirely airtight or fluid tight, the perimeter wall 38 forms a protective encasement about the interior 36 and elements positioned within the interior. In some embodiments, the perimeter wall 38 may be generally tubular in shape with a substantially uniform width, although other configurations may be utilized. The axle assembly 30 may also include a hub 40 rotatably mounted on each of the ends 34, 35 of the axle housing with each of the hubs 40 having one of the wheels mounted thereon. Each of the hubs may include a plurality of fastening studs 42 for fastening the rim 26 of a wheel to the respective hub. A bearing 44 may be positioned between each of the hubs and the end of the axle housing to facilitate rotation of the hub and associated wheel with respect to the axle housing.

The conveyor support structure 20 may also include an axle support beam 46 which may be pivotally movable with respect to the support truss structure 22 as well as any support frame supporting the support trust structure. The support beam 46 may have an outer end 48 which is swingable between a transport position for engaging the wheels 24, 25 with the ground surface, and a use position for removing the wheels from engagement with the ground surface and generally elevating the wheels above the ground surface to a location which may be relatively closer to the support truss structure 22. In some embodiments, the support beam 46 may have an outer surface which is generally cylindrical in shape. A mount 50 may be configured to mount the axle assembly 30 on the axle support beam 46, and may include a mount sleeve 52 that defines a passage 54 which may extend along an axis oriented generally perpendicular to the rotation axis of the wheels, although a degree of deviation from precise perpendicularity may be utilized. A strut 56 may reinforce the mounting of the mount sleeve 52 to the perimeter wall 38 of the axle housing 32. A portion of the axle support beam 46 adjacent to the outer end 48 may be inserted into the passage 54 of the mount 50 and this connection may permit a degree of rotation of the mount 50 and the axle assembly 30 with respect to the axle support beam 46 to permit the orientation of the wheels and the axle assembly to adjust to the configuration of the terrain on which the wheels rest and travel.

The conveyor 10 may also include a rotation detection assembly 60 which is configured to detect rotation of at least one of the wheels 24, 25 of the pair of wheels. The rotation detection assembly 60 may be integrated with the axle assembly 30, and may be at least partially positioned within the interior 36 of the axle housing 32. The rotation detection assembly 60 may include a rotation member 64 which is configured to rotate with at least one of the wheels 24, 25 so that the rotation member and the wheel rotate as a unit. The rotation member 64 may be at least partially positioned in the interior 36 of the axle housing, and in some embodiments the member 64 is entirely positioned within the interior. The rotation member may be connected to the hub 40 of the axle assembly to rotate with the hub and the wheel mounted thereon. In some embodiments, the rotation member 64 may be elongated with an outboard end 66 which is positioned at the hub and connected to the hub to rotate with the hub, and an inboard end 68 which is positioned relatively closer to a center of the elongated axle housing 32. Illustratively, the rotation member may comprise a rotation rod positioned in the axle housing interior 36.

The rotation detection assembly 60 may also include a rotation sensor 70 which is configured to sense rotation of the rotation member 64, and by extension, the wheel with which the rotation member rotates. The rotation sensor 70 may comprise any suitable sensor for detecting and communicating the degree of rotation of the rotation member, and illustratively may comprise an encoder 72 configured to generate a signal which corresponds (or can be translated) to a number of rotations of the rotation member sensed by the encoder. The rotation sensor 70 may be positioned in the interior 36 of the axle housing to thereby provide the encoder with a protective environment in which to operate.

The detection assembly 60 may also include a sensor housing 76 which is mounted on the axle housing 32 and may be integrated with the housing 32. The sensor housing 76 may define a sensor housing interior 78 which may be in communication with the interior 32 of the axle housing, and may be distinct or separate from the interior 36 or may overlap to some degree with the interior 36. In some embodiments, the encoder 72 of the rotation sensor may be positioned in the sensor housing interior 78 of the sensor housing. The sensor housing 76 may include a peripheral wall 80 which extends about the sensor housing interior 78, and the wall 80 may be mounted on the perimeter wall 38 of the axle housing in a manner that may integrate the peripheral wall with the perimeter wall. The peripheral wall 80 may define an aperture 82 through which a portion of the rotation member 64 may extend into the sensor housing interior such that the inboard end 68 of the rotation member may be positioned in the interior 78. The peripheral wall may also define an access opening 84 to provide access to the sensor housing interior from a location exterior of the housing 76 as well as exterior of the axle housing 32. The access opening 84 may be located on the peripheral wall and in some embodiments is located generally opposite of the perimeter wall 38 of the axle housing.

A housing cap 88 may be provided to selectively close the access opening 84 of the sensor housing. The housing cap 88 may be removably mounted on the peripheral wall of the sensor housing in a position extending across the access opening 84 to close the opening as well as provide access to the opening when the cap 88 is removed. The housing 88 may be secured to the peripheral wall in any suitable manner, and preferably in a manner that resists or prevents movement of contaminants into the sensor housing interior. Optionally, the sensor housing 76 may also include a sensor mount 94 configured to support the rotation sensor 70 in the sensor housing interior. The sensor mount 90 may support the rotation sensor in a spaced relationship with respect to the peripheral wall, and may include a saddle for receiving a portion of the sensor. In some embodiments, a bearing 92 may rotatably support the rotation member 64 on the sensor housing, and the bearing may be mounted on the peripheral wall in a position adjacent to the aperture 82 in the wall 80.

Figure 7:
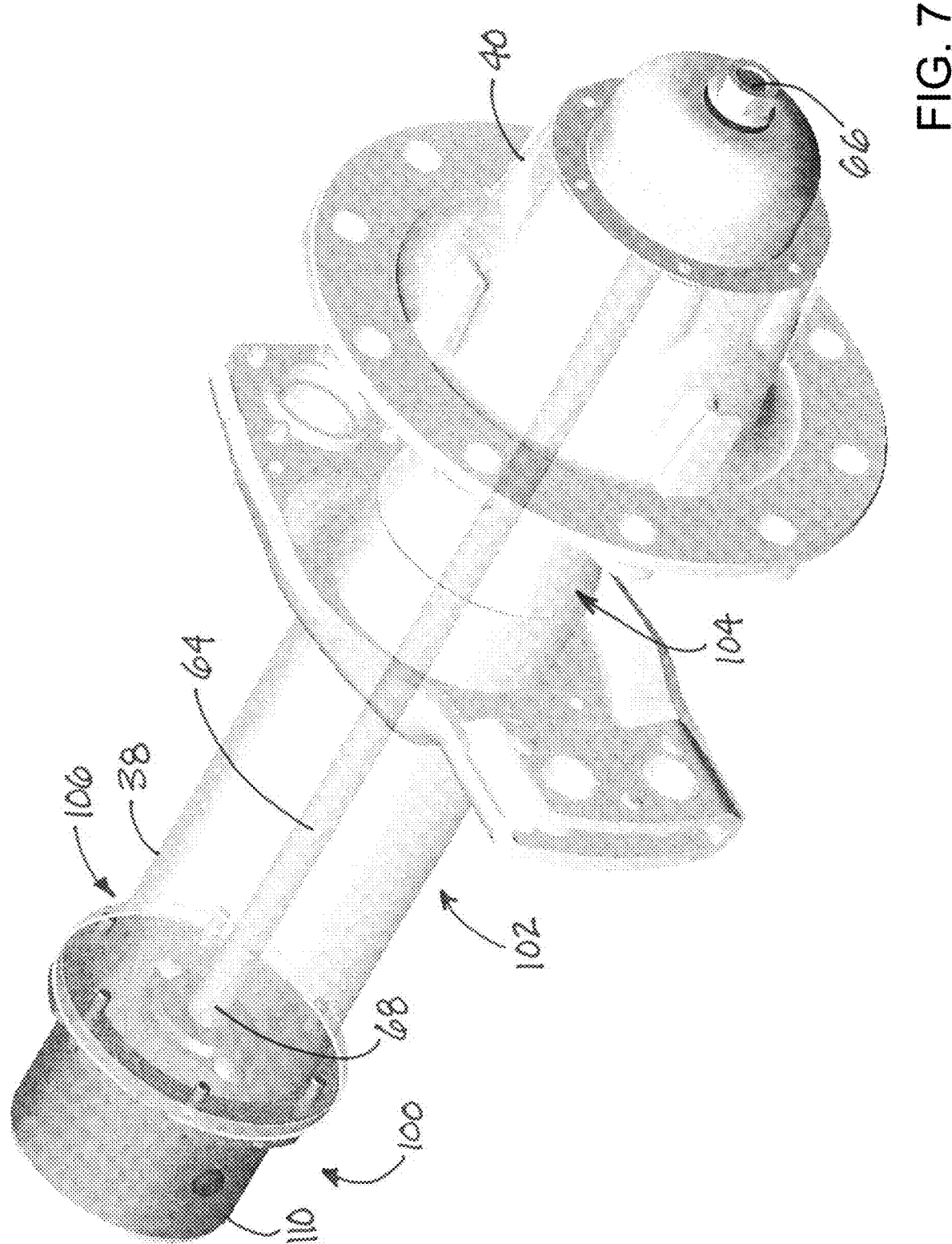
FIG. 7 is a schematic perspective view of an optional configuration of an axle-integrated movement sensing apparatus, according to an illustrative embodiment.
Figure 8:
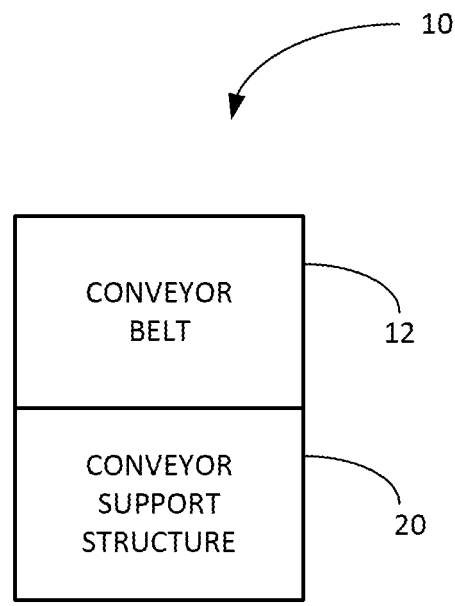
FIG. 8 is a schematic diagram of elements of the system of the disclosure including the conveyor, according to an illustrative embodiment.

In some embodiments, such as shown in FIG. 7, a rotation detection assembly 100 may be mounted on a stub or short axle 102 in a location generally adjacent to an inner end 106 of the axle and opposite of an outer end 104 of the axle 102. The sensor housing 110 may be mounted on the inner end 106 such that a closed axle interior is formed between the hub and the sensor housing. The rotation member 112 may extend between the hub and the sensor housing through the interior of the stub axle and into the sensor housing, where the rotation sensor is positioned.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A radial stacking conveyor system comprising:
   a conveyor belt;
   a conveyor support structure configured to support the conveyor belt on the support truss structure, the conveyor support structure comprising:
      a support truss structure extending between ends of the conveyor support structure;
      a pair of wheels rotatable about a common rotation axis;
      an axle assembly configured to rotatably support the wheels, the axle assembly including:
         an elongated axle housing with opposite ends each having a said wheel of the pair of wheels rotatably mounted thereon, the axle housing having an interior;
         a hub rotatably mounted on each of the ends of the axle housing, each hub having one of the wheels mounted thereon;
   a rotation detection assembly for detecting rotation of at least one of the wheels of the pair of wheels, the rotation detection assembly being integrated with the axle assembly and at least partially positioned within the interior of the axle housing.

2. The system of claim 1 wherein the rotation detection assembly comprises:
   a rotation member connected to the hub to rotate with the hub and at least one of the wheels, the rotation member being at least partially positioned in the interior of the axle housing; and
   a rotation sensor configured to sense rotation of the rotation member, the rotation sensor being positioned in the interior of the axle housing.

3. The system of claim 2 wherein the rotation member and the rotation sensor of the rotation detection assembly are completely contained within the interior of the axle housing.

4. The system of claim 2 wherein the rotation sensor comprising an encoder configured to generate a signal corresponding to rotations of the rotation member sensed by the encoder of the rotation sensor.

5. The system of claim 2 wherein the rotation detection assembly further comprises a sensor housing mounted on the axle housing, the sensor housing defining a sensor housing interior, the rotation sensor being positioned in the sensor housing interior.

6. The system of claim 5 wherein the sensor housing is integrated with the axle housing and the sensor housing interior is in communication with the interior of the axle housing.

7. The system of claim 6 wherein the axle housing includes a perimeter wall extending between the ends of the axle assembly; and wherein the peripheral wall of the sensor housing is integrated with the perimeter wall of the axle housing.

8. The system of claim 5 wherein the rotation detection assembly further comprises a sensor mount supporting the rotation sensor in the sensor housing interior.

9. The system of claim 5 wherein the rotation detection assembly further comprises a bearing rotatably supporting the rotation member on the sensor housing.

10. The system of claim 2 wherein the interior of the axle housing is substantially hollow and the rotation member of the rotation detection assembly extends through a portion of the substantially hollow interior.

11. The system of claim 2 wherein the rotation member comprises an elongated rotation rod with an outboard end connected to the hub and an inboard end connected to the rotation sensor.

12. A conveyor system comprising:
a conveyor belt;
a conveyor support structure configured to support the conveyor belt on the support truss structure, the conveyor support structure comprising:
 a support truss structure extending between ends of the conveyor support structure;
 a pair of wheels rotatable about a common rotation axis;
 an axle assembly configured to rotatably support the wheels, the axle assembly including:
  an elongated axle housing with opposite ends each having a said wheel of the pair of wheels rotatably mounted thereon, the axle housing having an interior;
  a hub rotatably mounted on each of the ends of the axle housing, each hub having one of the wheels mounted thereon;
a rotation detection assembly for detecting rotation of at least one of the wheels of the pair of wheels, the rotation detection assembly being integrated with the axle assembly and at least partially positioned within the interior of the axle housing;
wherein the rotation detection assembly comprises:
 a rotation member connected to the hub to rotate with the hub and at least one of the wheels, the rotation member being at least partially positioned in the interior of the axle housing; and
 a rotation sensor configured to sense rotation of the rotation member, the rotation sensor being positioned in the interior of the axle housing;
wherein the rotation detection assembly further comprises a sensor housing mounted on the axle housing, the sensor housing defining a sensor housing interior, the rotation sensor being positioned in the sensor housing interior; and
wherein the sensor housing comprises:
 a peripheral wall extending about the sensor housing interior, the peripheral wall being mounted on the axle housing, the peripheral wall defining an access opening providing access to the sensor housing interior; and
 a housing cap removably mounted on the peripheral wall of the sensor housing, the housing cap being removably positioned over the access opening defined by the peripheral wall to close the access opening.

13. The system of claim 12 wherein the peripheral wall of the sensor housing defines an aperture through which the rotation member extends into the sensor housing interior.

14. The system of claim 12 wherein the conveyor comprises a radial stacking conveyor.

15. A rotation detection assembly for detecting rotation of at least one wheel mounted on an axle assembly supporting a conveyor with a conveyor belt, the axle assembly having an axle housing defining an interior and a rotatable hub on which the at least one wheel is mounted, the assembly comprising:
a rotation member at least partially positioned in the interior of the axle housing and being connectable to the hub to rotate with the hub and the at least one wheel mounted on the hub; and
a rotation sensor configured to sense rotation of the rotation member, the rotation sensor being positionable in the interior of the axle housing; and
a sensor housing configured to be mounted on the axle housing and defining a sensor housing interior in communication with the interior of the axle housing.

16. The assembly of claim 15 wherein the conveyor comprises a radial stacking conveyor.

17. The assembly of claim 15 wherein the rotation sensor is positioned in the sensor housing interior of the sensor housing in addition to the interior of the axle housing.

18. The assembly of claim 15 wherein the sensor housing comprises:
a peripheral wall for mounting on the perimeter wall of the axle housing, the peripheral wall extending about the sensor housing interior, the peripheral wall defining an access opening providing access to the sensor housing interior; and
a housing cap removably mounted on the peripheral wall of the sensor housing and being removably positioned over the access opening to close the access opening.

* * * * *